United States Patent [19]
Bechtel et al.

[11] Patent Number: 5,452,390
[45] Date of Patent: Sep. 19, 1995

[54] DETACHABLE FIBER OPTIC CONNECTOR

[75] Inventors: J. Scott Bechtel, Lafayette; Steven B. Creswick, W. Lafayette; James E. Smous, South Bend, all of Ind.

[73] Assignee: CTS Corporation, Elkhart, Ind.

[21] Appl. No.: 231,569

[22] Filed: Apr. 22, 1994

Related U.S. Application Data

[62] Division of Ser. No. 55,465, Apr. 29, 1993, abandoned.

[51] Int. Cl.6 .................................................. G02B 6/36
[52] U.S. Cl. ........................................... 385/92; 385/60
[58] Field of Search ..................... 385/60, 66, 67, 68, 385/88-94

[56] References Cited

U.S. PATENT DOCUMENTS

4,166,668  9/1979  MacLeod ........................... 385/94
5,109,453  4/1992  Edwards et al. .................... 385/90
5,325,456  6/1994  Cullen et al. ....................... 385/94
5,359,688  10/1994 Underwood ........................ 385/56

*Primary Examiner*—Rodney B. Bovernick
*Assistant Examiner*—John Ngo
*Attorney, Agent, or Firm*—Albert W. Watkins

[57] ABSTRACT

A detachable fiber optic connector provides connection from an optical source or sink through a hermetic connection to a removable attached optical fiber. Ferrules and a split ring are used for alignment. A variety of alternative embodiments are illustrated for providing coupling force between the ferrules and retaining forces to prevent movement of the connection during movement of the fiber relative to the optical source or sink. These detachable fiber optic connectors provide great benefit when combined with hermetic packaging.

8 Claims, 9 Drawing Sheets

DETACHABLE FIBER OPTIC CONNECTOR

This application is a division of application Ser. No. 08/055,465, filed Apr. 29, 1993, now abandoned

BACKGROUND OF THE INVENTION

1. Field of the Invention

This invention pertains to optical waveguides and detachable connectors therefor, with particular application to hermetic packages housing an optical source or sink and detachable connectors that mate with features of the package.

2. Description of the Related Art

Optical or lightwave communications are being utilized in more applications today than ever before. These optical systems provide benefits not previously available in electrical systems. Benefits such as large bandwidth available for signal transmission, excellent noise immunity, limited crosstalk, and low weight per unit bandwidth are common.

However, demanding applications for optical systems continue to motivate further development in several areas where optical systems are more restrictive than electrical counterparts. Chief among the disadvantages of an optical system are the relative fragility of the glass fibers used as lightwave conductors and the difficulty interconnecting these fibers to transmitters, receivers, and other fibers. Low-loss, low cost, reliable and easily removable connectors are very much needed to continue to expand the applications for optical technology.

There are several factors that determine the cost, quality and applicability of an optical connection. The fragility and small size of a typical fiber is important. During manufacture production costs escalate while quality and yield suffer if the fiber is damaged. During installation an installer will need to make all needed interconnections without adversely affecting the fiber or the connection. A fiber should not be scratched or bent excessively, and generally is jacketed to prevent this type of damage. However, this objective of ease of handling during manufacture and installation is usually in opposition to the advantages provided intrinsically by the fiber of low size and weight for a given bandwidth capacity.

The efficiency of the coupling from the fiber to an optical source or sink is also very important. For the purposes of this disclosure an optical source or sink is defined to be an LED, laser diode, phototransistor, attenuator, modulator, optical IC, waveguide, polarizer, filter, other optical fiber or similar component which by design generates, transmits or receives a lightwave. Coupling efficiency is often described as insertion loss. Insertion loss in axial type interconnections can result from center to center mismatch between the source and sink axes, angular misalignment of the source and sink axes, separation between the source and sink, optical imperfections on the surfaces of or in between the source and sink, and reflections. For two fused silica fibers having a diameter of 5 mils, center to center mismatch of only 0.5 mils will add a loss of approximately one db to the connection loss. Similarly, angular misalignment of about 3 degrees will also add about one db of loss.

Any foreign matter between the fibers may also adversely impact insertion loss. Where the fiber is connected through a package, package hermeticity may also be important. For purposes of this disclosure, a hermetic seal is defined as one which provides a very low leak rate, in a range comparable to that achievable with a fully brazed entirely metal package, and which also provides a lack of atmospheric exchange as would be detected by a residual gas analysis (RGA).

Typical polymer materials are not able to meet the long term hermeticity and RGA requirements due to infusion of moisture and other contaminants. Leak rates less than $1 \times 10^{-8}$ atm-cc/second are commonly obtainable with metals and non-porous glasses and non-porous ceramics. Metals, non-porous glasses, and non-porous ceramics will also meet the RGA requirement imposed for the purposes of this disclosure, while, as noted, known polymers will not.

Moisture impervious seals and gas-tight seals are defined for the purposes of this disclosure as seals that provide an environmental barrier to infusion of water, dirt, and other contaminants present with rapid infusion of air. This type of seal is typically obtained with a polymer type seal ring, and may be non-hermetic as defined herein.

The space required for an interconnection may prevent some otherwise successful designs from being accepted for a given application. The relative ease of attachment of the connector is also very important. Advantages gained in a fine fiber with low mass are lost by a bulky connector and heavy fiber reinforcement. Similarly, if the fiber is for all practical purposes permanently affixed, perhaps due to difficulty in alignment, any benefit gained by a detachable connector may be lost.

Optical connectors often use some type of sleeve to align fibers both center to center and axially. Examples of such alignment sleeves may be found in U.S. Pat. Nos. 4,193,665, 4,636,034, 4,707,068, 4,750,803, 4,892,379, 4,948,224, 5,000,537, and 5,005,940, hereby incorporated by reference. These sleeves may be expandable and slide directly around the fiber, but more often a ferrule is used to carry the fiber. The ferrule will provide a more mechanically sound structure for insertion into and removal from the sleeve, while generally preventing any scratching from occurring at or near the optically active surfaces of the fiber.

In addition to ferrules and an alignment sleeve, fiber butt connectors require mechanical retention to maintain the fibers in a closely spaced relationship. Once again, there is a size and performance trade-off demanded by the prior art. A physically strong connector which is resistant to flexure and pull of the fiber will usually require a large latching and spring structure to maintain the fibers closely spaced and aligned. Examples of these latching mechanisms may be found in any number of U.S. Pat. Nos. such as 4,140,365, 4,553,813, 4,737,008, 4,747,656, 4,762,388, 4,762,389, 4,779,952, 4,799,758, 4,877,303, and 4,896,938, also incorporated herein by reference.

The present invention seeks to overcome those prior art limitations of size and weight while still retaining the advantages of low insertion losses, low weight per unit bandwidth, high bandwidth capacity, and detachable interconnection.

SUMMARY OF THE INVENTION

A detachable fiber optic connector provides connection from an optical source or sink through a hermetic connection to a removable optical fiber. Ferrules and a split ring are used for alignment. A variety of alternative embodiments are illustrated for providing coupling force between the ferrules and retaining forces to prevent movement of the connection during movement of the fiber tail relative to the optical source or sink. Each embodiment illustrates a low-profile connector sufficient to meet the demanding SEM E military format for package dimension and also withstand the military vibration specifications. The coupling force is sufficient to elastically deform the ends of the fibers, resulting in a motionless, contaminant free coupling without an intermediary medium of different refractive index. The resulting connectors have a coupling loss of less than 0.5 decibels (db), and typically a loss of less than 0.25 db.

DESCRIPTION OF THE PREFERRED EMBODIMENT

Figure 1:
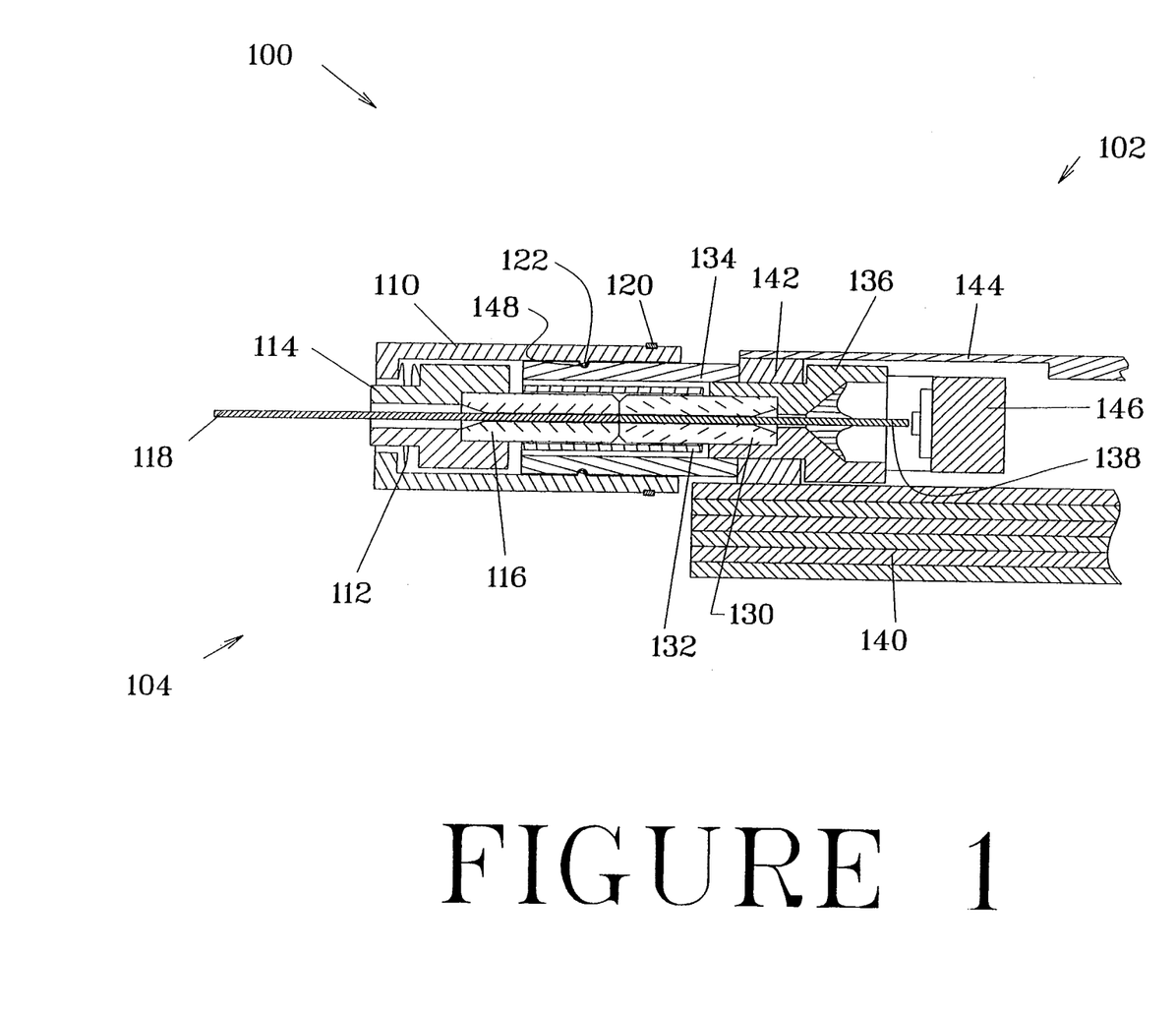
FIG. 1 illustrates a first embodiment of the invention from a side cross-section view.

FIG. 1 illustrates a first embodiment of the present invention from a side cross-section view. The detachable connector and optic assembly, in a connected configuration is illustrated generally by reference numeral 100. The detachable connector assembly 104 includes an end cap 110 and engaging spring 112 to provide a compressive or engaging force upon connector body 114. Connector body 114 transmits the compressive force to ferrule 116 which is firmly bonded to fiber 118.

The optic assembly is generally illustrated by reference numeral 102. Assembly 102 includes a package substrate 140, which in this embodiment is illustrated as a multi-layer low-temperature co-fired ceramic (LTCC) substrate. An LTCC substrate is preferred since complex circuitry may be routed in a very high density pattern within this type of substrate. Furthermore, this type of substrate offers hermeticity and superior environmental resistance. However, for those applications demanding other characteristics, the use of other substrate materials of known types is considered to be within the skill of one of the art. A few exemplary materials of known benefit include alumina, aluminum nitride and silicon carbide.

Sealed to the surface of package substrate 140 is a seal ring 142 which might typically be formed from an iron-nickel-cobalt alloy sold under the trade name Kovar.

Kovar is preferred in this instance for a match of expansion coefficient (TCE) with the LTCC substrate 140. Where a different substrate material is selected, a different composition for seal ring 142 may also be required. Once again, those familiar with the packaging industry will at once be able to select both a suitable substrate material and a matching seal ring.

Completing the hermetic enclosure is cover 144 which is typically fabricated from a metal material, often of the same composition as the seal ring 142.

Within optic assembly 102 is an optical device header 146. This may support an optical source or sink or other optical component. Further, header 146 may also serve to support other non-optical active and passive components, where appropriate. Header 146 is in optical alignment with optical fiber 138. Fiber 138 passes through fiber holder 136 and through ferrule 130. As is visible in this partial cross-section side view, the hermetic enclosure is further formed by the fiber holder 136, fiber 138, and ferrule 130. In this and later embodiments, fiber to ferrule attachments are made hermetic through plating, sputtering or other known methods of metallizing the optical fiber. The fiber may then be brazed or soldered to the ferrule to form a hermetic seal. For gas-tight or moisture impervious seals, epoxy or other similar adhesive bonding may be more than adequate.

Nose tube 134 also forms a part of assembly 102 and also forms an integral part of the retention mechanism for detachable connector assembly 104. In use, a split sleeve 132 may be inserted either into nose tube 134 or into end cap 110, around ferrule 130 or ferrule 116, respectively. The detachable connector assembly 104 is then slid into the engaged position as illustrated in FIG. 1, to where the slight protrusion feature 122 engages with the mating groove 148 of nose tube 134. The snap ring 120 is then engaged around end cap 110, forming a mechanically sound retention between assemblies 104 and 102.

At the time of engagement of detachable connector assembly 104 with optic assembly 102, ferrules 116 and 130 become abutted, and split sleeve 132 serves to retain the two ferrules in axial alignment. Further, engaging spring 112 is compressed slightly, to ensure that the two ferrules are pressed toward each other. This tends to offset any forces pulling along fiber 118 that might otherwise separate the two ferrules. Additionally, engaging spring 112 provides adequate force to elastically deform fiber 118 against fiber 138.

The two fibers 118 and 138 during polishing of their respective mating ends are formed to be slightly convex. These two convex ends are pressed together and thereby flattened against each other. While this elastic deformation may be slight, the inventors have found this to offer a number of very significant advantages. Primarily, the fibers are optically interconnected without transmission of the optical signal through a medium of differing refractive index. This reduces optical losses in accord with Snell's law. Additionally, during vibration the fibers are not free to rub against one another, but are already held fixed relative to each other. This prevents formation of debris between the fibers and also prevents the scratching of the surfaces of the two fibers, both which would otherwise be to the detriment of the connector. The elastic deformation of the fibers, though only discussed in detail in regard to this first embodiment, is understood to be an integral feature that the inventors chose to incorporate in each of the remaining embodiments.

Figure 2:
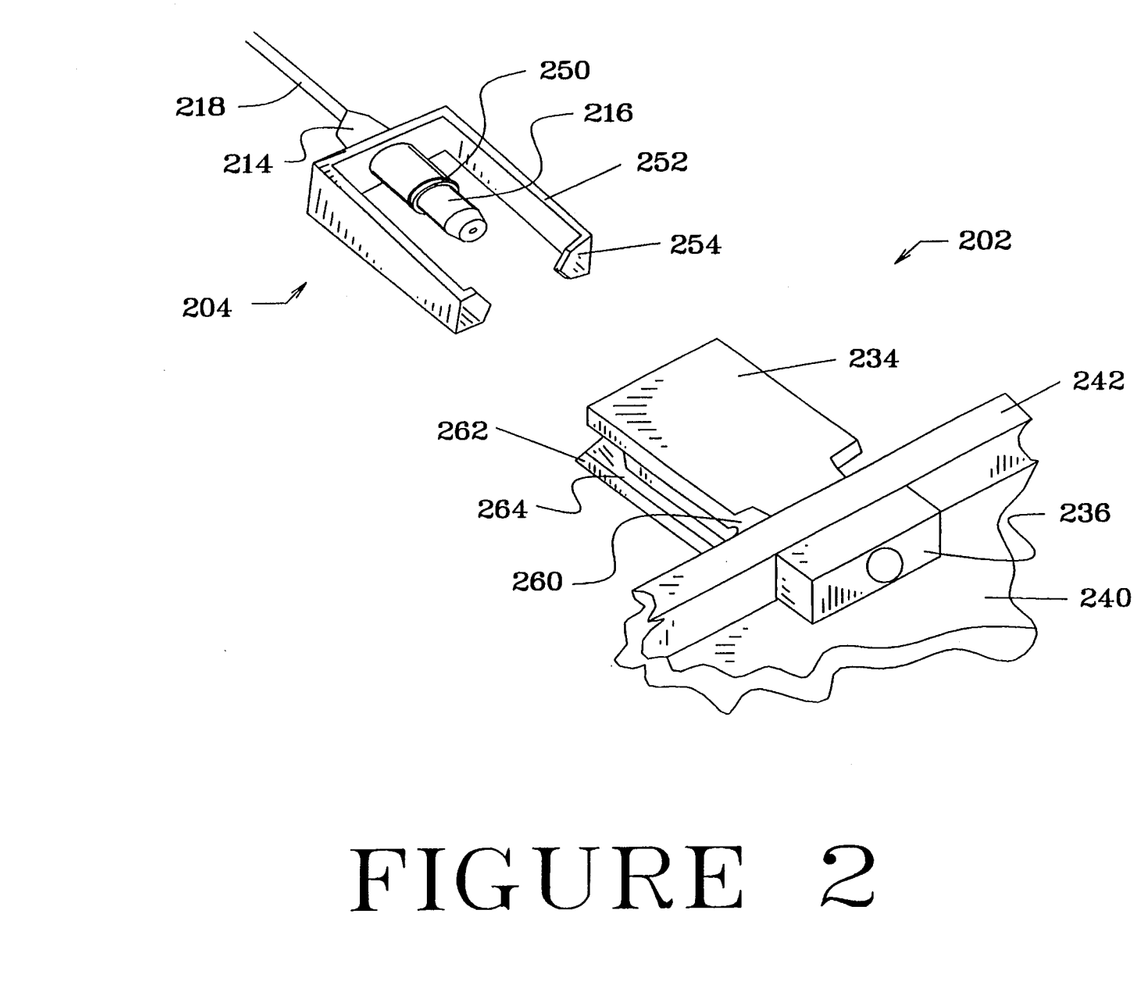
FIG. 2 illustrates a second embodiment of the invention from a perspective view.
Figure 3:
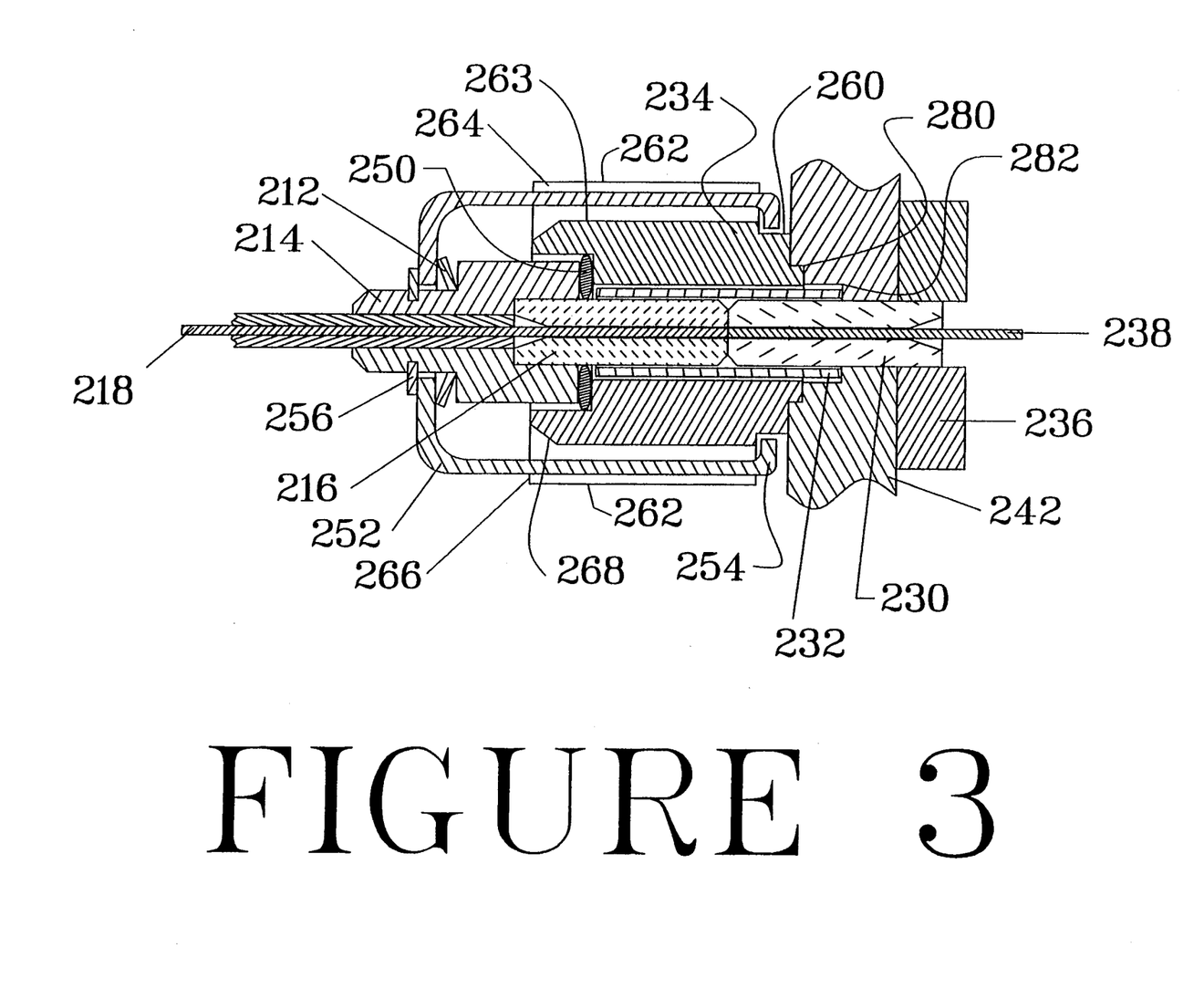
FIG. 3 illustrates the second embodiment from a top cross-section view.

FIGS. 2 and 3 illustrate a second embodiment of the detachable fiber optic connector, by cut-away perspective view in FIG. 2 and by top cross-section in FIG. 3. Like parts between the drawings have been similarly numbered, and where appropriate, similar parts to the first embodiment have been so designated by retaining the same last two digits.

An optical assembly 202 is illustrated which may be hermetic. The walls of the hermetic enclosure include substrate 240, seal ring 242, a cover (not shown) similar to cover 144 of the first embodiment, fiber 238 (visible in FIG. 3), and ferrule 230 (visible in FIG. 3). A ferrule holder 236 is attached firmly to the hermetically enclosed side of assembly 202. Seal ring 242 has several steps 280, 282 formed therein into which nose block 234 and split sleeve 232 may abut and be located. Nose block 234 might, for example, be brazed into place. Nose block 234 has slight indents 260, channels 263 with channel walls 264, and bevels 268, the purpose of which will described later. Additionally, nose block 234 has edge surfaces 262 with channels 263 formed therein and a front face 266 opposite seal ring 242.

Detachable connector assembly 204 includes a U-shaped retaining claw 252 with small protrusions 254, ferrule 216, connector body 214, O-ring 250, fiber 218, belleville washer type engaging spring 212, and c-clip 256. Retaining claw 252 is formed from a relatively rigid but slightly resilient material, such as a stamped and formed sheet steel. Other materials such as stainless steel, beryllium copper, nickel, etc may be used, depending upon the service conditions and environment which the component will be exposed.

The connection process, from disconnect illustrated in FIG. 2 to connect illustrated in FIG. 3 is very simple. Detachable connector assembly 204 is moved toward optical assembly 202, with the point of first contact occurring between protrusions 254 and bevels 268. Bevels 268 serve to spread retaining claw 252 sufficiently to allow protrusions 254 to slide within channels 263, guided by channel walls 264. Any gross errors in axial alignment are corrected at this point by the relatively close fit between retaining claw 252 and channel walls 264. As assemblies 202 and 204 are moved into further engagement, ferrule 216 begins to be inserted into split sleeve 232. Split sleeve 232 performs a finer axial alignment than the interaction between retaining claw 252 and channel walls 264, ensuring close tolerance axial alignment between fibers 218 and 238. As assemblies 202 and 204 are moved yet closer, O-ring 250 begins to compress. O-ring 250 then provides a gas-tight or moisture impervious seal between nose block 234 and connector body 214, thereby protecting the interface between fibers 218 and 238 from moisture or particle contamination.

Once assemblies 202 and 204 are pressed together sufficiently, protrusions 254 slide off channel surface 263 into the slight indents 260. There is a sharp edge between channels 263 and indents 260, providing an engagement surface for protrusions 254. The engagement of protrusions 254 into indents 260 latches assemblies 202 and 204 together.

As with each of the embodiments of the invention, a hermetic package is provided which serves to protect an optical source or sink from the environment, while still providing a high quality optical interface through a removable connector just external to the hermetic enclosure. In this embodiment, the optical connection between fibers 218 and 238 further includes a gas-tight seal, protecting this interconnect from dirty ambient environments. Also demonstrated among the many advantages offered by this embodiment is a very low profile. Those of ordinary skill in the art will recognize many permutations or adaptations suited for each individual requirement or application.

Figure 4:
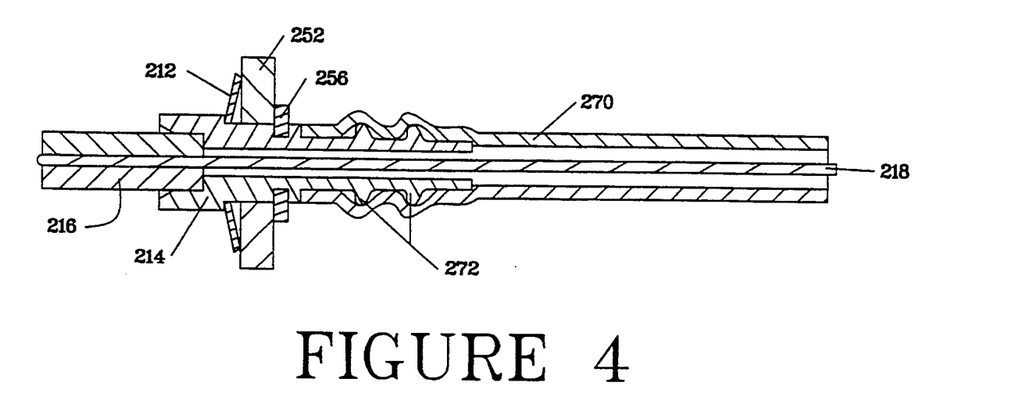
FIG. 4 provides more detail of the fiber to connector engagement by cross-section view.
Figure 5:
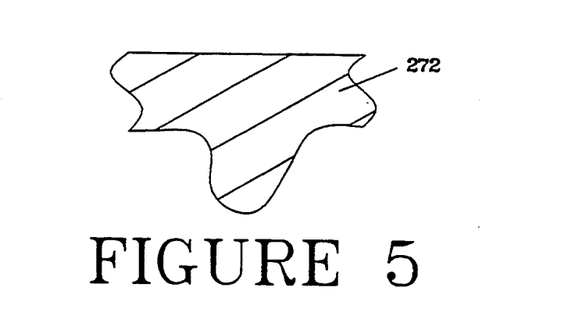
FIG. 5 illustrates in enlarged view the retention barbs of FIG. 4.

One such example is illustrated in FIGS. 4 and 5, which provides for a sheathed optical fiber. Illustrated therein is optical fiber sheath 270. Sheath 270 is typically of a polymer type material of some resilience and strength which protects the fiber from abrasion and scratches which otherwise would be very detrimental to the fiber's strength and flexibility. In order to retain the sheath in place physically, connector body 214 is provided with small engaging protrusions 272 thereon which act to stretch the sheath 270. Due to the directional slope of the small engaging protrusions 272, better illustrated in exploded FIG. 5, sheath 270 is more readily slid over protrusions 272 than removed therefrom, providing further mechanical support for fiber 218.

Figure 6:
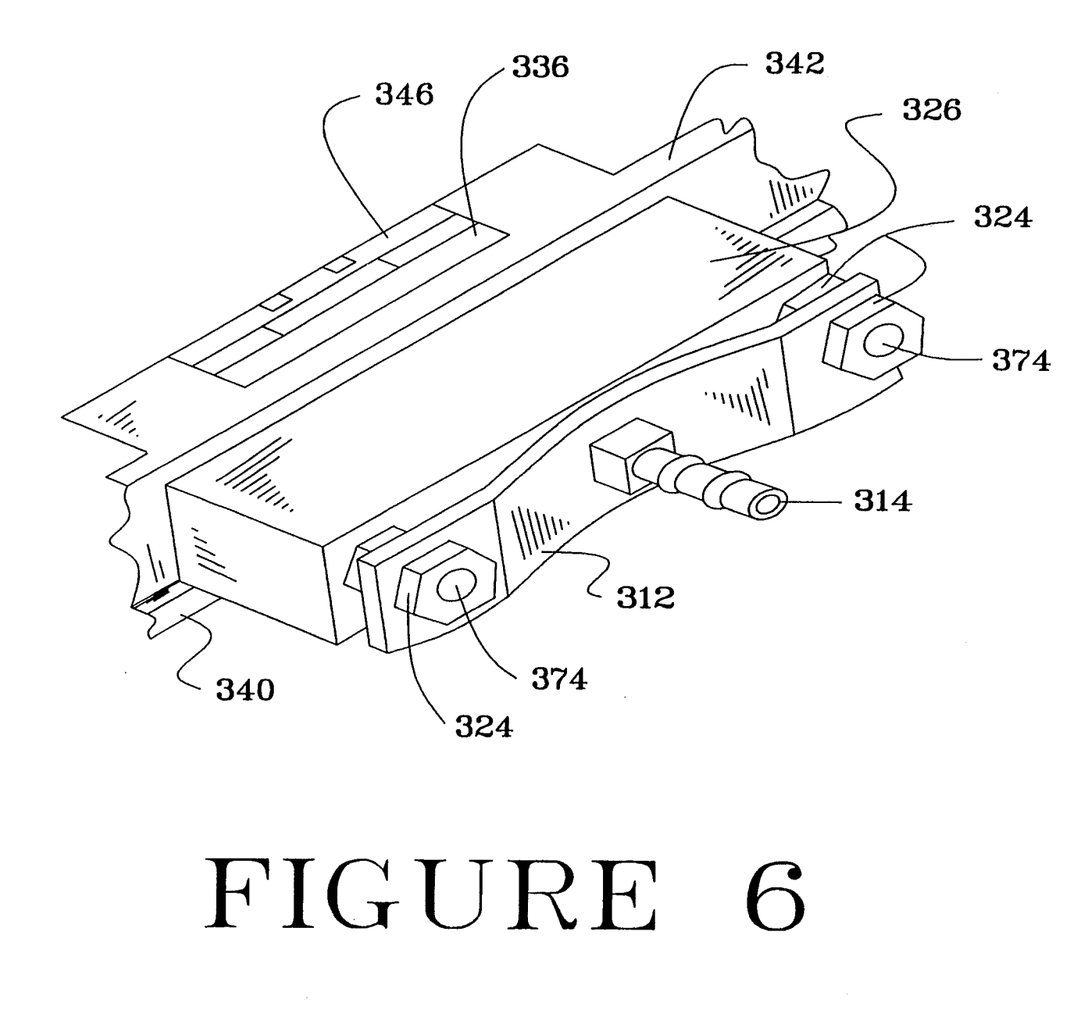
FIG. 6 illustrates a third embodiment of the invention from a projected view with the optic sleeve assembly removed.
Figure 7:
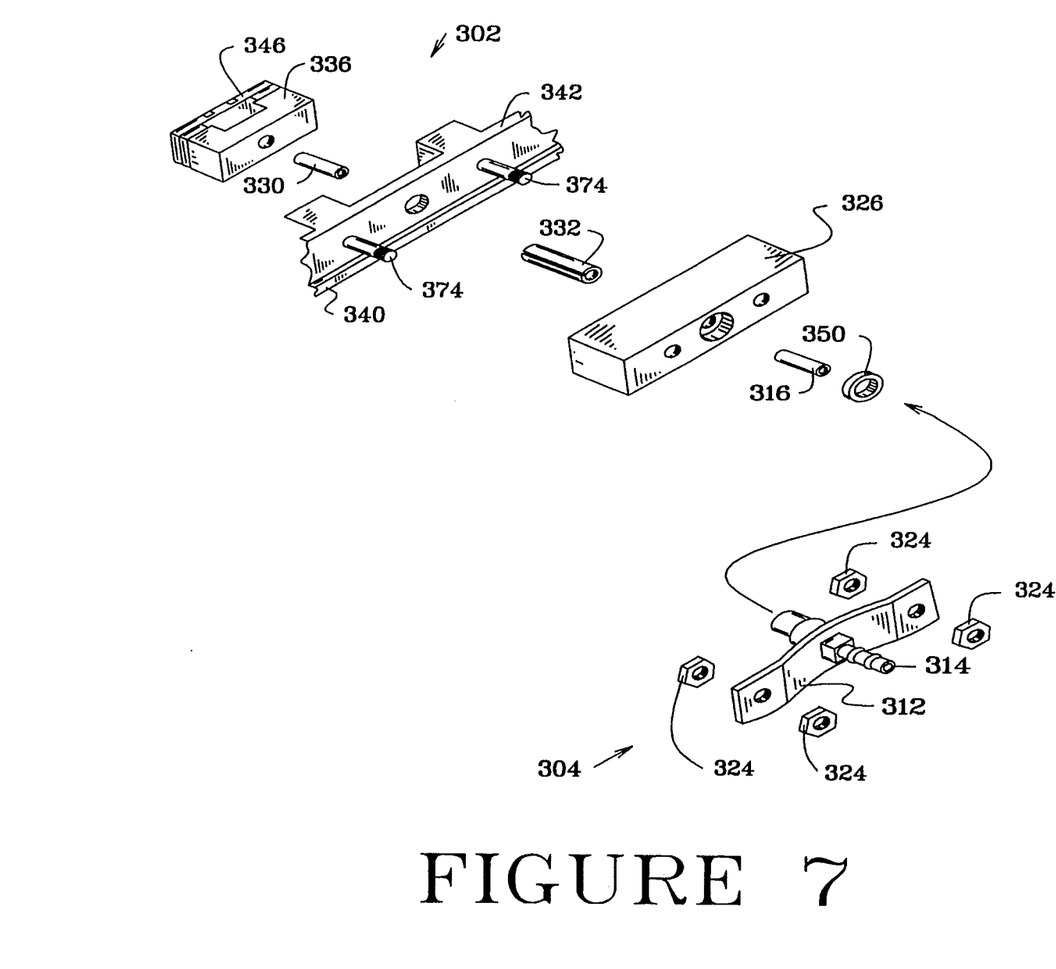
FIG. 7 illustrates the third embodiment by exploded perspective view.
Figure 8:
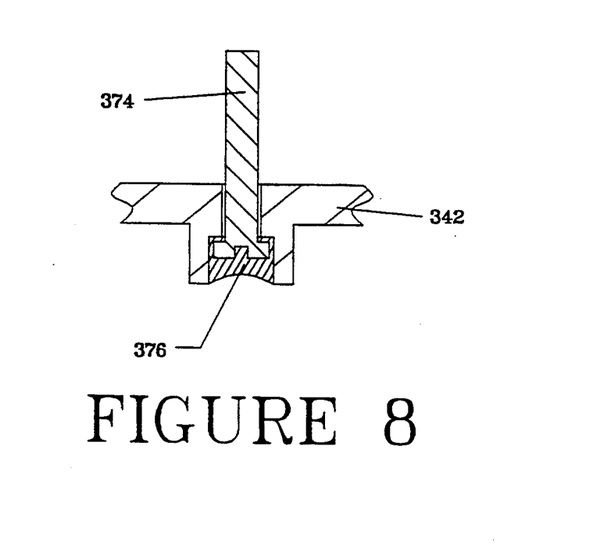
FIG. 8 illustrates the assembly of the threaded studs from FIG. 7 in more detail.

FIGS. 6, 7 and 8 illustrate a third embodiment of the invention, with the optical fibers and sheath removed from the views for clarity. Although not illustrated, it is to be understood that the optical fibers will be connected in a manner similar to that illustrated in FIGS. 1–5. FIG. 6 shows the detachable connector and optic assembly 300 in a connected position from a projected view. FIG. 7 illustrates assembly 300 in an exploded view, where the exploding of the components has been performed along the optical axis of the fibers. FIG. 8 shows a section view of seal ring 342 taken through the center of threaded retaining stud 374 to show one method of attachment therebetween.

In this third embodiment, detachable connector assembly 304 illustrated generally in FIG. 7 includes a connector body 314 similar to body 214. Connector body 314 is retained in place by firm attachment to engaging spring 312, which is a slightly formed piece of resilient material such as spring steel. Attachment between connector body 314 and engaging spring 312 is not critical, and may be accomplished by using a threaded nut which sides over the sheath side of connector body 314, or by brazing or other suitable means. Connector body 314 includes an O-ring 350 resiliently retained circumferentially and ferrule 316 extending therefrom.

Optic assembly 302 includes an optical device header 346 similar to header 146, a ferrule holder 336 similar to fiber holder 136, a ferrule 330 extending from ferrule holder 336 and hermetically sealed into seal ring 342, and threaded retaining studs 374 hermetically brazed or soldered into seal ring 342 with braze or solder 376. Optical device header 346 is protected from ambient by a hermetic seal formed between seal ring 342, package substrate 340, a cover (not illustrated) similar to cover 144, ferrule 330, and threaded retaining studs 374.

Connection between assemblies 302 and 304 is achieved through the use of an interfacing mounting frame 326, which is formed with three holes therein. Two of the holes are provided for passage of studs 374 and one hole is provided for passage of the fibers (not illustrated), ferrules 316 and 330, and split sleeve 332. Mounting frame 326 may be formed from most any material, including plastic, metal, ceramic, and even glass, though a material such as plastic or a malleable metal could provide a gas-tight seal with seal ring 342 without the need for any gasket or additional seal ring.

Further, mounting frame 326 could be permanently adhered to seal ring 342, but not without sacrificing some of the advantages yet to be described.

Once mounting frame 326 is located against seal ring 342, split sleeve 332 may be inserted therein. Two of the retaining nuts 324 may then be threaded onto retaining studs 374 and tightened down so as to firmly retain mounting frame 326 in place. Next, engaging spring 312 is slid onto retaining studs 374 and similarly bolted into place using the additional two retaining nuts 324 illustrated. While retaining nuts 324 are illustrated for exemplary purposes, one of skill in the art will immediately recognize that a large number of suitable fasteners are known that could be substituted for the nuts. O-ring 350 forms a gas-tight seal between assembly 304 and mounting frame 326, thereby forming a moisture impervious or gas-tight seal around the optical connection between ferrules 316 and 330 through the optical fibers.

This third embodiment is particularly advantageous in the ability to remove the detachable connector assembly 304 with the removal of two retaining nuts 324 while leaving the remaining assembly undisturbed. The area exposed around ferrule 330 when assembly 304 is removed is also readily accessible by removal of an additional two retaining nuts 324, allowing a technician access for cleaning or other required activity. Once again, a hermetic environment may be provided for optical device header 346 and the optical interconnection between ferrules 316 and 330 is enclosed in a gas-tight enclosure. Additionally, a technician may readily access all components external to the hermetic environment. These features are all provided in a package of very low profile and yet which is sturdy and reliable.

Figure 9:
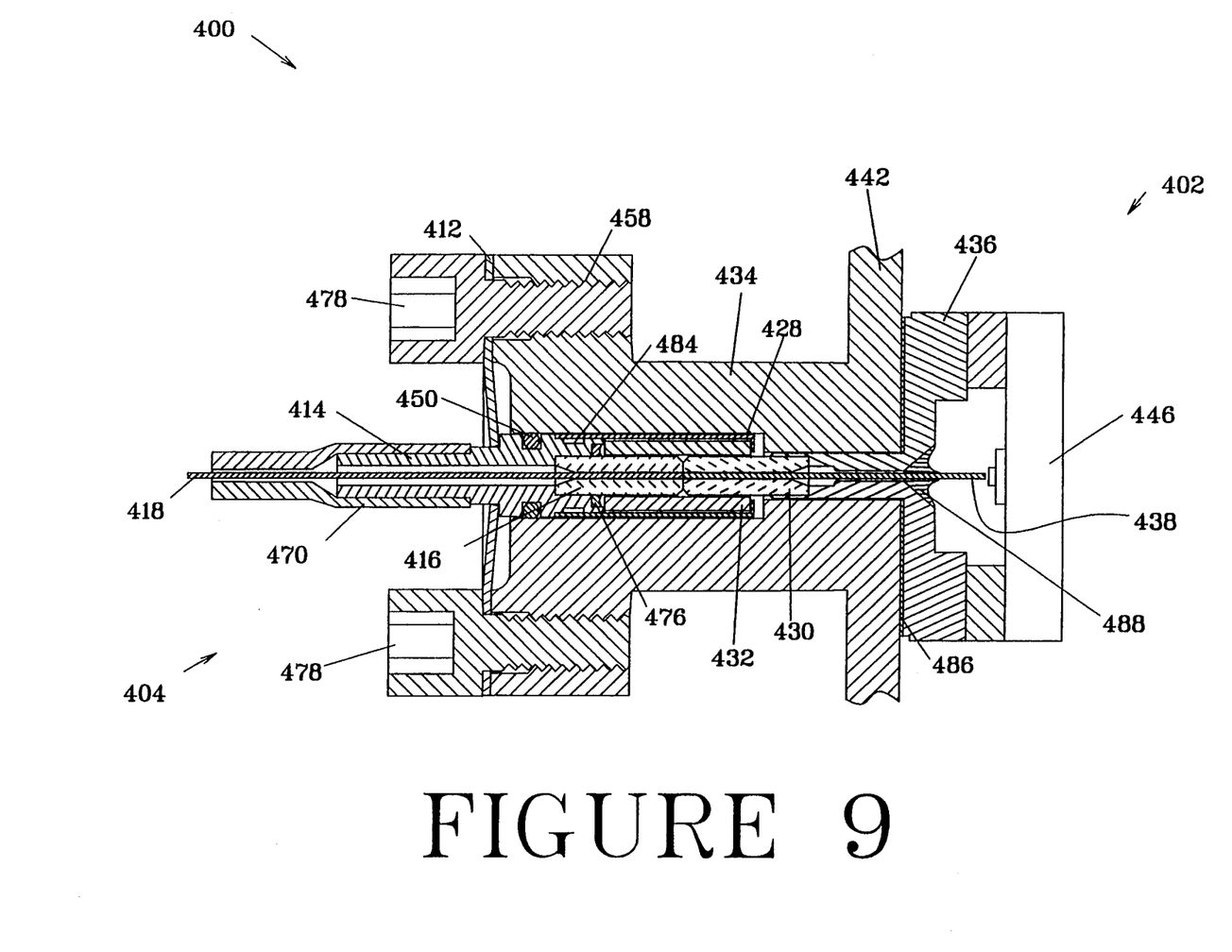
FIG. 9 illustrates a fourth embodiment of the invention from a top cross-section view.
Figure 10:
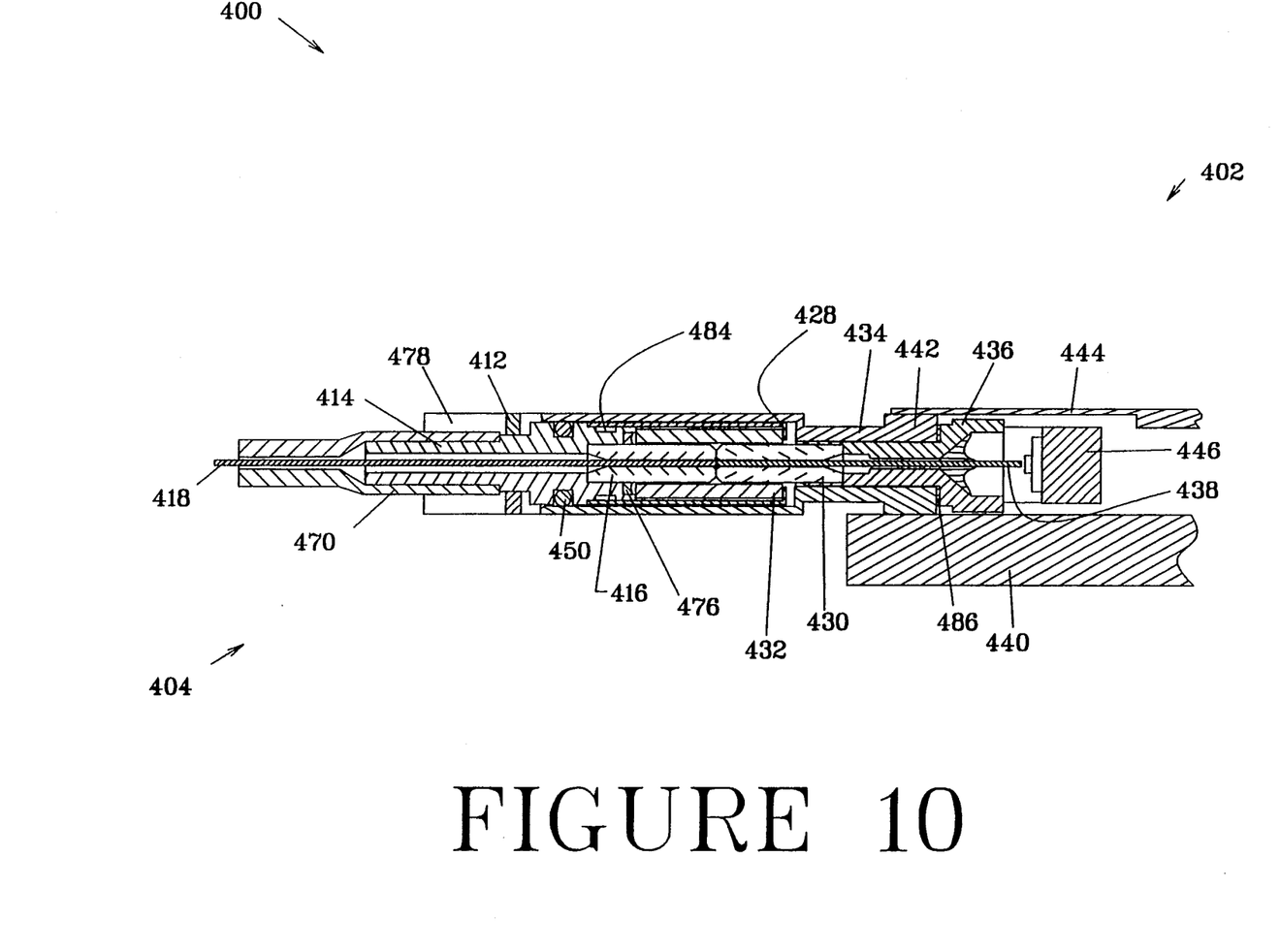
FIG. 10 illustrates the fourth embodiment from a side cross-section view.

FIGS. 9 and 10 illustrate a fourth embodiment of the present invention. FIG. 9 illustrates a cross-section view taken in a horizontal plane about midway up the seal ring, through the center line of optical fibers 418 and 438. FIG. 10 illustrates the fourth embodiment from a side cross-section view. In these illustrations, as with the previous eight figures, any additional components within the hermetic enclosure are not illustrated, as they form no part of this package. Further, it will be apparent that the hermetic package formed by substrate 440, seal ring 442, and cover 444 will extend beyond the illustration and will in most cases include other significant features, such as electrical interconnections and other electronic circuitry as may be deemed appropriate. Those features do not form a part of the present invention, aside from the necessary understanding that the optical interconnections illustrated herein may be used to interconnect through a hermetic package.

As with the previous embodiments, there is an optical source or sink header 446 which communicates through optical fiber 438 to optical fiber 418. Fiber 438 is sealed into ferrule holder 436 and also into ferrule 430. Ferrule holder 436 is sealed into seal ring 442. Seal ring 442 has a nose block 434 formed integrally therewith, such as by electrical discharge machining, casting, forging or other satisfactory method. Into nose block 434 are threaded two holes 458. These components form the optic assembly, generally referenced as 402 in the figures.

Forming the detachable connector assembly 404 are optical fiber 418, sheath 470, connector body 414, engaging spring 412, O-ring 450, ferrule 416, split sleeve 432, connector body cap 428 and screws 478. While most of the components correspond to their counterparts from earlier embodiments, connector body cap 428 is new. The connector body cap 428 is affixed to connector body 414 on the end adjacent O-ring 450, and on the end opposite is folded in towards the center axis. This connector body cap 428 may be formed, for example, from stainless steel. Body cap 428 serves to retain split sleeve 432 together with detachable connector assembly 404. Upon disconnection between assemblies 402 and 404, no loose components will remain. Aside from the potential for loss, deformation or contamination if dropped, the positive removal of split sleeve 432 with assembly 404 allows for better access to ferrule 430 and fiber 438.

Figure 11:
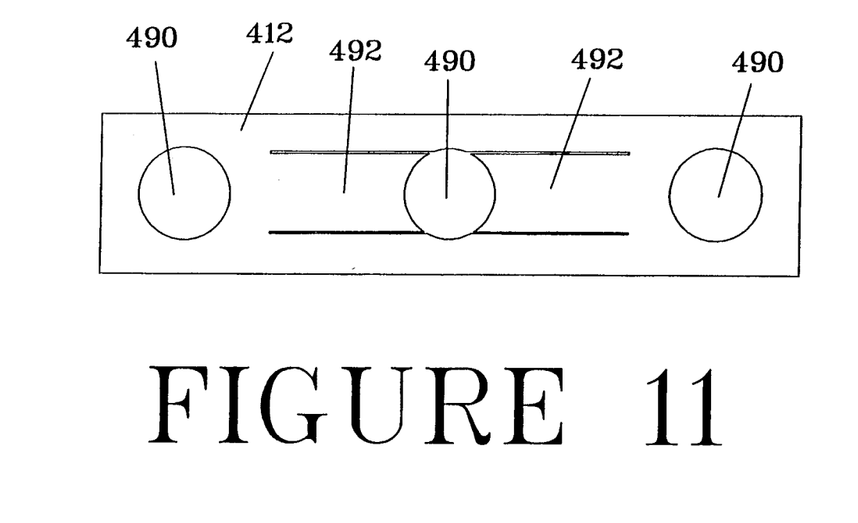
FIG. 11 illustrates the engaging spring 412 of the fourth embodiment of the invention from a top view.
Figure 12:
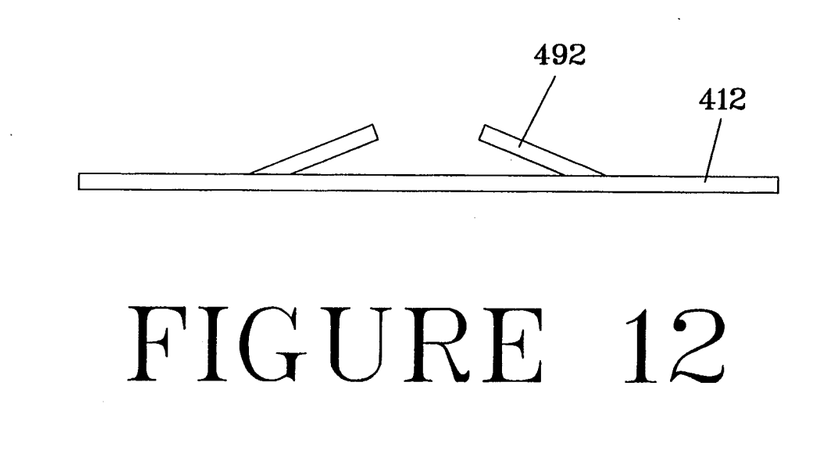
FIG. 12 illustrates the engaging spring 412 of the fourth embodiment from a side view.

Engaging spring 412 is shown in more detail in FIGS. 11 and 12. Spring 412 has hoes 490 formed therein to accommodate both the screws 478 and the fiber. Formed engaging tabs 492 extend away from the relatively planar surface of spring 412 towards the fiber junction. Formation of tabs 492 offers several advantages, including better control over the force applied through a simple spring design, and pull-out protection since when the pigtail is pulled, the opening 490 between tabs 492 is reduced in size below the diameter of fiber 418. Noteworthy is the fact that screws 478 are not intended to be adjustable, but rather are tightened down as far as possible. All control over the coupling force is designed into the engaging spring 412 operating in conjunction with nose block 434. Since the characteristics of spring 412 are easily controlled through thickness, material selection, various treatment processes such as heat treatment and other methods well known in spring design, precision assembly is not required.

While the foregoing details what is felt to be the preferred embodiments of the invention, no material limitations to the scope of the claimed invention is intended. Further, features and design alternatives that would be obvious to one of ordinary skill in the art are considered incorporated herein. Examples of this are the reversals between male and female portions of the connectors. In the preferred embodiments, the greatest mass is incorporated onto the package side of the connection, resulting in less inertia and therefore less force upon and reduced loss through the optical connection during shock and vibration delivered to the package. However, for those designs requiring less robust construction, there may be advantage in reversing the male and female portions. Other similar design modifications will be apparent to those of ordinary skill which do not detract from the present invention, but rather which further highlight the flexibility and applicability of the invention. The scope of the invention is set forth and particularly described in the claims hereinbelow.

We claim:

1. A low profile detachable fiber optic connector detachably interconnecting an hermetically packaged optic source or sink with a first optic waveguide comprising:

an hermetic enclosure enclosing an optic source or sink having a pass-through hole therein, and having first and second retention means extending from said hermetic enclosure exterior, said first and second retention means adjacent to said pass-through hole but on opposite sides thereof;

a second optic waveguide having a first termination and a second termination, said second optic waveguide aligned to optically interact with said optic source or sink from said first termination of said second optic waveguide, said second optic waveguide passing through said hermetic enclosure at said pass-through hole;

a first ferrule, said first ferrule surrounding said first optic waveguide adjacent a termination of said first optic waveguide;

a second ferrule, said second ferrule surrounding said second optic waveguide adjacent said second termination and sealed thereto, said second ferrule further sealed to said pass-through hole so that said second optic waveguide and said second ferrule hermetically seal said pass-through hole;

an interfacing mounting frame having a first opening therethrough co-axial with said first and said second ferrules and generally concentric therewith, said interfacing mounting frame further having second and third openings therethrough with said first and second retention means passing therethrough;

an alignment sleeve co-axial, generally concentric with and mechanically coupled to said first and second ferrules for maintaining relative alignment therebetween, said alignment sleeve also co-axial and internally concentric with said interfacing mounting frame;

a generally flat spring retainer transverse to said first ferrule and having a center section mechanically engaging said first ferrule, said spring retainer further having first and second resilient extensions extending from said center section of said spring retainer also generally transverse to said first ferrule, said first and second resilient extensions each including a hole therethrough through which said retention means passes, said retention means engaging said spring retainer to retain said spring retainer in a spring biased position against said interfacing mounting frame and said first ferrule, thereby retaining said interfacing mounting frame in fixed position relative to said hermetic enclosure and said spring retainer, while simultaneously biasing said second termination of said second optic waveguide against said termination of said first optic waveguide.

2. The low profile detachable fiber optic connector of claim 1 further comprising a notched region in an interior wall of said hermetic enclosure into which said ferrule holder is engaged, said ferrule holder carrying thereon said optic source or sink.

3. The low profile detachable fiber optic connector of claim 1 wherein said spring retainer comprises an integral piece of formed sheet metal.

4. The low profile detachable fiber optic connector of claim 3 wherein said center section of said spring retainer is bowed slightly towards said interfacing mounting frame.

5. The low profile detachable fiber optic connector of claim 1 wherein said optic waveguide comprises optical fiber.

6. The low profile detachable fiber optic connector of claim 1 wherein said optic source or sink comprises an optoelectronic device for generating or receiving optical signals.

7. A male fiber optic connector of low mass comprising:

an optical fiber;

a cylindrical ferrule having a precise bore therein, said optical fiber passing therethrough and permanently attached thereto;

a generally flat spring retainer transverse to said ferrule having a center section having a hole formed therein through which said optical fiber passes, said spring retainer center section mechanically engaging said ferrule, said spring retainer further having two resilient extensions extending from said center section of said spring retainer also generally transverse to said ferrule, said resilient extensions including a hole therethrough.

8. The male fiber optic connector of claim 7 further comprising a gasket means concentric to said ferrule and adjacent to said connector body.

* * * * *